(12) United States Patent
Salmon et al.

(10) Patent No.: US 6,991,374 B2
(45) Date of Patent: Jan. 31, 2006

(54) COMPUTER CONTROLLED MICROSCOPE

(75) Inventors: Nicholas James Salmon, Romerberg (DE); Ernst Hans Karl Stelzer, Meckesheim (DE)

(73) Assignee: European Molecular Biology Laboratory, Heidelberg (DE)

( * ) Notice: Subject to any disclaimer, the term of this patent is extended or adjusted under 35 U.S.C. 154(b) by 0 days.

(21) Appl. No.: 10/257,039

(22) PCT Filed: Apr. 6, 2001

(86) PCT No.: PCT/EP01/04001

§ 371 (c)(1),
(2), (4) Date: Mar. 12, 2003

(87) PCT Pub. No.: WO01/78008

PCT Pub. Date: Oct. 18, 2001

(65) Prior Publication Data

US 2003/0161515 A1   Aug. 28, 2003

(30) Foreign Application Priority Data

Apr. 6, 2000   (EP) ................................ 00107110

(51) Int. Cl.
*G06K 9/00*   (2006.01)
(52) U.S. Cl. .................... 383/128; 383/133; 700/90
(58) Field of Classification Search ................ 700/129, 700/124, 114, 90; 356/300, 319, 326, 328; 382/133, 128
See application file for complete search history.

(56) References Cited

U.S. PATENT DOCUMENTS

| | | | |
|---|---|---|---|
| 5,449,857 A * | 9/1995 | Ohshima | 84/618 |
| 5,697,885 A | 12/1997 | Konomura et al. | |
| 5,859,700 A * | 1/1999 | Yang | 356/300 |
| 5,878,415 A | 3/1999 | Olds | |
| 6,026,226 A * | 2/2000 | Heile et al. | 716/12 |
| 6,101,265 A * | 8/2000 | Bacus et al. | 382/133 |
| 6,272,235 B1 * | 8/2001 | Bacus et al. | 382/133 |
| 2002/0061127 A1 * | 5/2002 | Bacus et al. | 382/128 |

FOREIGN PATENT DOCUMENTS

| | | |
|---|---|---|
| JP | 11-98442 A | 4/1999 |
| WO | WO 98/54636 A | 12/1998 |

OTHER PUBLICATIONS

"Process Automation with Enumeration and Traceability Tools"—Martinez et al, AT&T Bell Laboratories, 1995.*

(Continued)

*Primary Examiner*—Leo Picard
*Assistant Examiner*—Michael D. Masinick
(74) *Attorney, Agent, or Firm*—Wolf, Greenfield & Sacks, P.C.

(57) ABSTRACT

A computer controlled microscope is provided with improved usability, which allows a user to quickly build, modify and reuse complex sample illumination and/or observation processes by introducing a recordings hierarchy in which a recording can be both a parent recording of one or more child recordings and a child recording to a single parent recording. A recordings hierarchy allows control parameter data to be inherited from a parent recording to a child recording. The group of child recordings linked to a parent recording is called a recordings collection. Viewed together, recordings and recordings collections form a tree-like hierarchy. Single load and store functions associated with a recording permit the entire recording and child recordings hierarchy to be stored on a storage device and reloaded into the computer of a computer controlled microscope.

9 Claims, 5 Drawing Sheets

OTHER PUBLICATIONS

Salmon, N.J., Lindek, S. and Stelzer, E.H.K., "Databased for Microscipes and Microscopial Images", in "Handbook of Computer Vision and Applications", Jahne, B. HauBecker, H. and Geissler, P. (eds.), vol. 2, Academic Press, San Diego, 1999, pp. 907-926.

Atkinson, M. Bancilhon, F., Dewitt, D., Dittrich, K., "The Object-oriented Database System Manifesto", Proceedings of the First International Conference on Deductive and Object-oriented Databases, Kyoto, Japan, 1989, pp. 223-240.

Lindek, S., Fritsch, R., Machtynger, J., de Alarcon, P.A., Chagoyen, M., "Design and Realization of an On-line Database for Multidimensional Microscopic Images of Biological Specimens", in Journal of Structural Biology, Apr. 1999, vol. 125, pp. 103-111.

* cited by examiner

FIG.5

COMPUTER CONTROLLED MICROSCOPE

Computer controlled microscopes allow users to set various parameters via a user interface and to initiate the acquisition of image data on the basis of parameter sets. The image data and the associated set of parameters can be stored on a storage device, for example a computer hard disc or a network server.

In the following, a set of control parameter data, for example size and position of an imaging area, resolution, illumination intensity, detection sensitivity and time data, will be called a recording. A recording defines a sequence of operations and/or the status of a microscope and can be loaded and used to configure the microscope, enabling, for example, the acquisition of image data under identical conditions, in comparison with the acquisition of image data using the same set of control parameter data before in a different location or at a later time.

In general, a microscope can be used to perform sample illumination and/or sample observation. A recording defines both sample illumination and/or sample observation by defining the operational status of the microscope. Consequently, the execution of a recording is to be understood as the process of sample illumination or the process of sample observation, as well as the combination of a plurality of these two processes.

The recent trend in the life sciences away from the observation of "fixed" samples, towards the observation of live specimens requires observations at discrete time points over an extended period of time, maybe days. Specimen preparation usually results in a coverslip's worth of cells covering an area far wider than may be observed by a single recording. Observation of a single cell at discrete time points over several hours means the microscope is actually working for only a small amount of the total experiment time, and that the microscope is missing the chance to observe many other cells, a serious under utilization of sample, microscope and scientists. Moreover, manual input over such long experiment times can easily result in simple user errors.

It is an object of the present invention to provide a computer controlled microscope with improved usability, which allows a user to quickly build, modify and reuse complex sample illumination and/or observation processes.

This object is achieved by introducing a recordings hierarchy in which a recording can be both a parent recording of one or more child recordings and a child recording to a single parent recording. A recordings hierarchy according to the present invention allows control parameter data to be inherited from a parent recording to a child recording. The group of child recordings linked to a parent recording is called a recordings collection. Viewed together, recordings and recordings collections form a tree-like hierarchy. Single load and store functions associated with a recording permit the entire recording and child recordings hierarchy to be stored on a storage device and reloaded into the computer of a computer controlled microscope. In other words, initiating a save function for a single recording causes not only the root recording, but all child recordings and recordings collections to be saved also to the storage device. Initiation of a load operation causes a root recording (i.e. a recording that has no parent recording) and child recordings and recordings collections to be created in the computer memory of the computer of the computer controlled microscope.

Each recordings collection may contain functions enabling recordings (and implicitly their child recordings) to be added to, removed from, and reordered within the collection, as well as functions enabling the recordings hierarchy to be traversed.

The standard microscope execute function is enhanced to allow the recordings hierarchy to be worked through with a single function call, passing as a parameter the highest level recording in the hierarchy, which is to be executed. In other words, a specific function "recording execute" first executes tasks specified by its own parameters, then loops through all recordings contained within its collection of child recordings, calling the same "recording execute" function on each of these recordings. Furthermore, any recording may be enabled or disabled with respect to the "recording execute" function, i.e. may be marked such that the "recording execute" function of the microscope will only initiate execution of those recordings which are enabled. The enabling or disabling of a recording may be achieved by introducing an "execution enabled" indicator as a further parameter of the recording.

Image data produced by each recording can be displayed in either a separate window, or the same window for a whole recordings hierarchy.

The recording execute function is tolerant of child recordings in which some parameters or groups of parameters are undefined. These recordings then inherit the undefined parameters from parent recordings, for example, either by copying the respective parameter values of the parent recording or by referring to the respective parameter value of the parent recording.

It should be noted that a computer controlled microscope may comprise a computer to control its settings and/or operations. A computer controlled microscope may also be linked to an external computer controlling its settings and/or-operations, for example a personal computer, or to a network of computers, which need not be located next to the microscope. Further, it should be noted that the term "microscope" relates not only to a microscope as such but also to any auxiliary device linked to or cooperating with the microscope in the process of image acquisition and specimen or sample handling. These devices may include but are not limited to heating or cooling units, gas or liquid supply units, power supply units, sample manipulators etc.

In the following, the invention will be described in greater detail with reference to the drawings in which FIG. 1 shows a schematic diagram of a computer controlled microscope according to the invention;

FIG. 5 shows another example of a user interface of a computer controlled microscope according to the invention.

Figure 1:
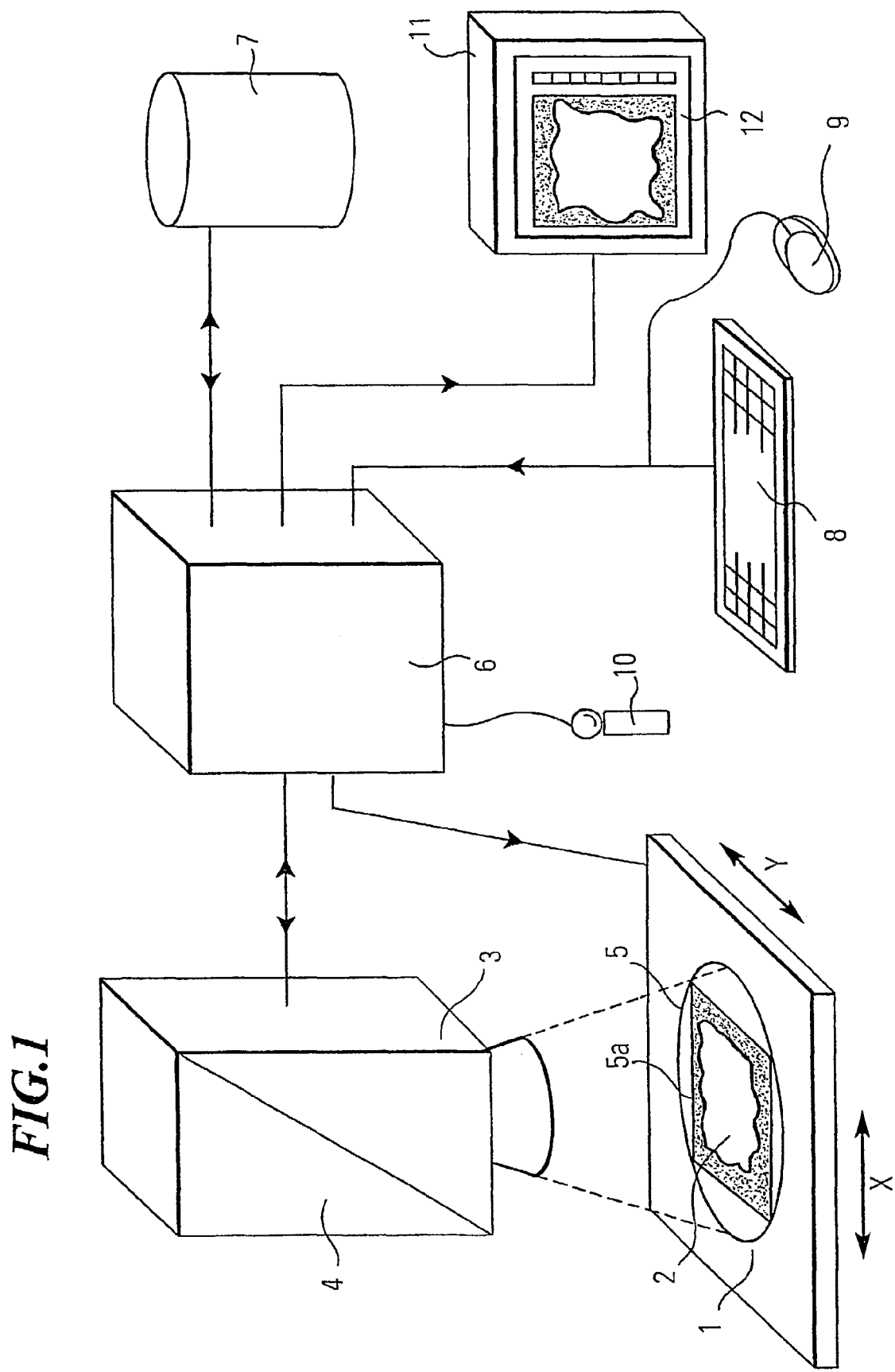

In FIG. 1, components of a computer controlled microscope are schematically shown and will be described in some detail in order to facilitate the understanding of the invention.

The computer controlled microscope comprises a stage 1 on which a sample can be placed and which can be moved in a plane indicated by X and Y. The sample is illuminated by means of an illuminating device 3. An imaging device 4 is located such that an image of the sample can be acquired, i.e. such that the sample 2 is placed within the imaging area 5 of the imaging device 4. The illumination device 3 and the imaging device 4 are located in the same housing as shown in FIG. 1 or may be provided as separate devices. In the microscope shown in FIG. 1, stage 1, illumination device 3 and the imaging device 4 are linked to a controller 6, preferably a computer. The controller 6 controls the operation and/or status of the microscope, i.e. the positioning device 1, the illuminating device 3, and the imaging device 4 shown in FIG. 1. In order to control the microscope a control program is executed by computer 6 after having been loaded into the memory (not shown) of computer 6. The control program is permanently stored and loaded from a storage device 7.

The user of the computer controlled microscope interacts with the system through input devices like keyboard device 8, pointing device 9, for example a computer mouse, a trackball, a touch screen or the like, and a microphone 10 and through output devices like display 11 of which more than one, as shown in FIG. 1, may be linked to the computer 6. On a display surface 12 of output device 11, a picture of sample 2 as recorded by imaging device 4 is displayed for inspection by the user and in addition to control elements of the control program executed by computer 6.

Computer 6 controls the operation and/or status of the microscope, for example by controlling the position of the positioning device 1, by controlling the kind and intensity of the illumination provided by illuminating device 3 and by controlling the shape, size and position of the imaging area 5 or imaging region 5a grasped by imaging device 4. Further computer 6 receives image data from imaging apparatus 4 and displays the image of sample 2 on output device 11 and/or stores the image on storage devices 7.

As mentioned before, the above description of a computer controlled microscope as schematically shown in FIG. 1 is given only to facilitate a better understanding of the invention described further below but is not intended to limit the scope of the invention to a computer controlled imaging device as shown in FIG. 1. However, the computer controlled imaging device as shown in FIG. 1 clearly indicates that a plurality of parameters of the imaging device are controlled by computer 6. These parameters include but are not limited to shape, size, orientation and position of the imaging region, resolution of the imaging device, illumination intensity, observation sensitivity, and time data (like start-time and duration) etc.

The major improvement provided by the invention is achieved by introducing a recording hierarchy into the way the computer works i.e. processes and stores/retrieves parameter data. The invention provides a computer controlled microscope with additional functionality and, therefore expands its usability as a technical scientific instrument.

Figure 2:
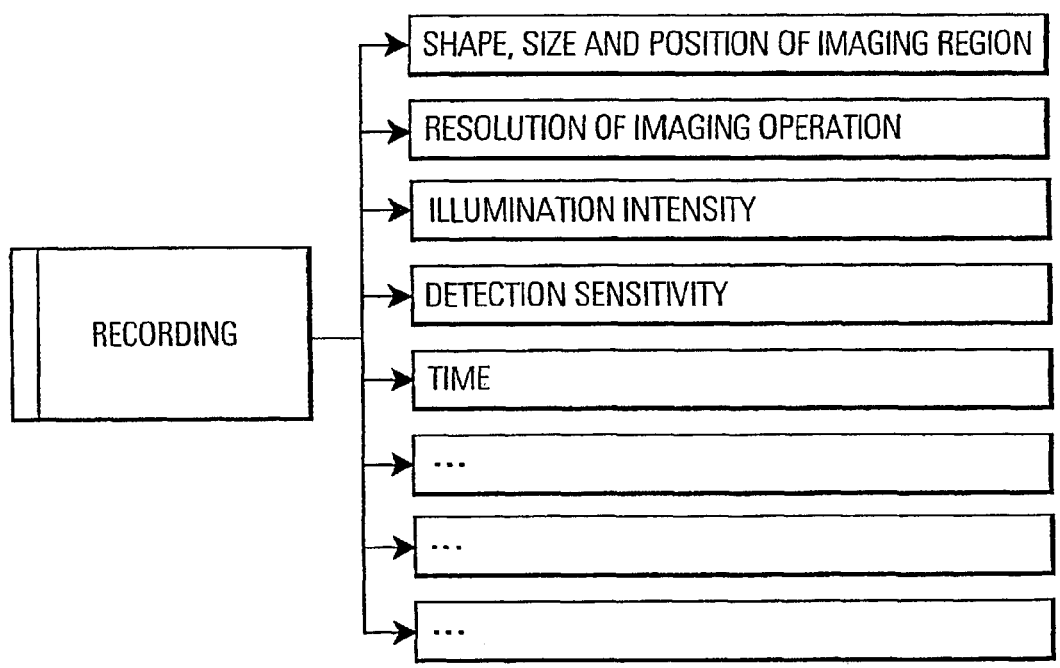
FIG. 2 shows the basic structure of a recording according to the invention.

In FIG. 2 the structure of a single recording according to the invention is shown, which may both a parent recording and a child recording in a recording hierarchy described in greater detail further below. As can be seen in FIG. 2, the recording comprises a set of parameters, for example shape, size and position of an imaging region, resolution, illumination intensity, detection sensitivity, time data (like start-time and duration) and other data related to the process of sample illumination or sample observation (image acquisition) or plurality of these processes.

It should be noted that a recording may comprise a plurality of each kind of parameter data. For example, a recording may comprise two or more parameters defining different imaging regions with respect to shape, size and position. Also, a recording may comprise different illumination and/or detection parameters.

Furthermore, a recording may comprise, as an additional parameter, an indicator as to whether or not the recording will be executed if a "recording execute" function of the computer controlled microscope is initiated. If set, the execution indicator will cause the "recording execute" function of the microscope to also execute the specific recording of which it is a parameter.

Figure 3:
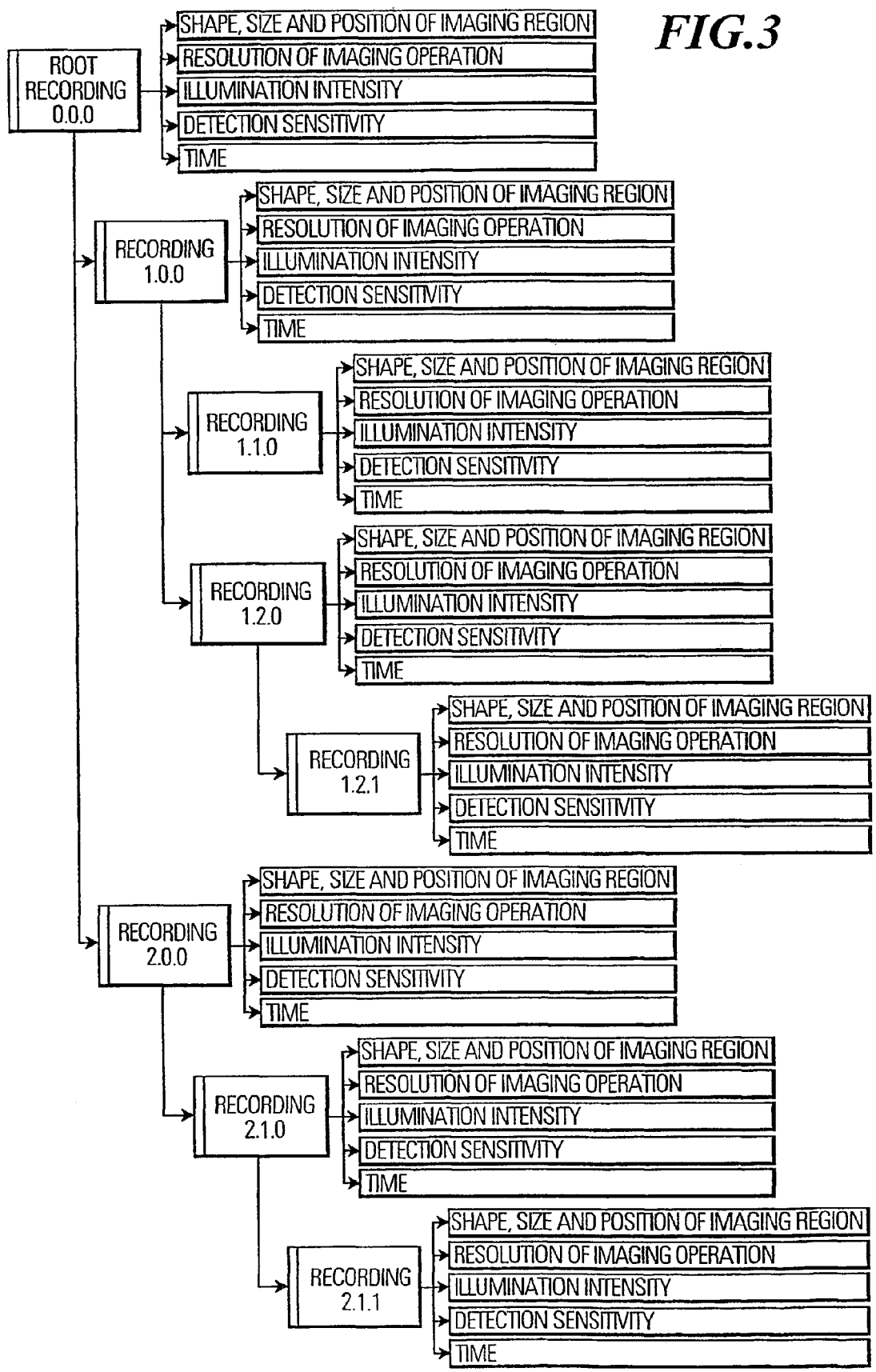
FIG. 3 shows an example of an recording hierarchy according to the invention.

In FIG. 3 an example of a recordings hierarchy is shown. Each of the recordings in this exemplary hierarchy comprises a set of parameters as discussed with respect to FIG. 2. However, it is obvious to the person skilled in the art that recordings within a recordings hierarchy according to the invention may comprise additional parameters or may be limited to fewer or different parameters.

A root recording 0.0.0 as shown in FIG. 3 is characterized in that it has no parent recording. The root recording 0.0.0 comprises control parameter data such as the shape, the size and the position of an imaging region, resolution of an imaging operation, illumination intensity, detection sensitivity and time. In the example of FIG. 3 this set of control parameter data is used for each recording shown in the figure.

The root recording 0.0.0 has two child recordings, i.e. recording 1.0.0 and 2.0.0, both of which comprise the set of control parameter data as mentioned above. Recording 1.0.0 is a parent recording to recordings 1.1.0 and 1.2.0, of which recording 1.2.0 is a parent recording for recording 1.2.1. Similarly, recording 2.1.0 is a child recording of recording 2.0.0 on one hand and a parent recording for recording 2.1.1 on the other hand.

It is apparent to a person skilled in the art that this hierarchy can be extended by adding further recordings being child recordings to any one of the recordings already being or becoming a part of the hierarchy shown in FIG. 3.

According to the invention, the control program of a computer controlled microscope comprises a function for creating a recording hierarchy by allowing the creation of a root recording and adding further recordings as child recordings of the root recording or of child recordings created in a previous step. The step of creating child recordings may also be understood as a function of adding recordings to the hierarchy. In a preferred embodiment, the control program of the computer controlled microscope further comprises the function of deleting a recording and/or the function of reordering the recordings in the recording hierarchy.

A benefit of introducing a recording hierarchy into the control program of a computer controlled microscope is that it introduces the possibility to inherit control parameter data from a parent recording to a child recording or group of child recordings.

For example, if a user has defined in a first step the root recording 0.0.0 shown in FIG. 3 control parameter data like shape, size and position of the imaging area, resolution of the image acquisition process, illumination intensity, detection sensitivity and time have been defined in order to fully describe the status and/or operation of the computer controlled microscope. If the user defines in a second step child recording 1.0.0 at least some of the controlled parameter data previously defined or set for root recording 0.0.0 are used for the definition of the control parameter data of child recording data 1.0.0. Similarly, control parameter data of the root recording 0.0.0 is inherited during the creation of child recording 2.0.0.

Of course, the control program of the computer controlled microscope according to the invention allows the user to override inherited control parameter data, for example by redefining the shape, size and/or position of the imaging region. With or without limitations based on the control parameter data of the parent recording, the user may change the control parameter data of the child recording.

The user may for example reduce the size of the imaging region of a child recording on one hand and increase the resolution of the imaging operation on the other hand.

Preferably, when the user creates a further child recording, the control parameter data of the parent recording are initially inherited by the child recording created.

The user gains access to the improved technical functions of the computer controlled microscope via a graphical user interface displayed on an output device. In the following, an example of such a user interface will be described. Obviously, the user interface may have a different look and arrangement of information.

Figure 4:
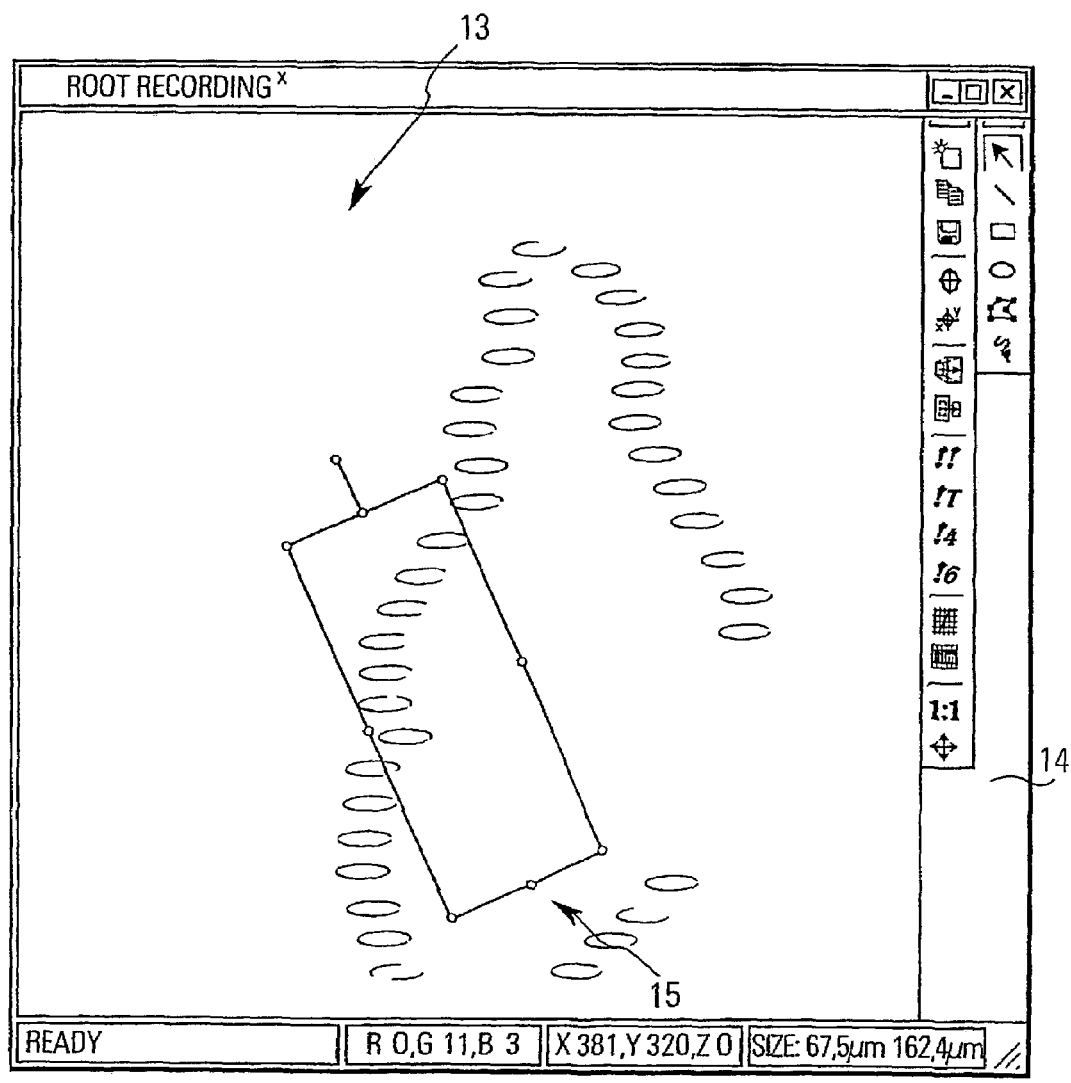
FIG. 4 shows an example of a user interface of a computer controlled microscope according to the invention.

In FIG. 4 an example of a graphical user interface is shown, which is displayed on the display device (see FIG. 1) of the computer controlled microscope, and which not only displays the image 13 of the sample 2 under observation, but also comprises graphical control elements 14 enabling the user to control the execution of the control program in the computer of the microscope.

The example in FIG. 4 shows the overview image 13, as defined by a root recording according to the invention, and one smaller imaging region 15 defined by a respective child recording according to the invention. The user may define the shape, the size, the orientation and the position of the smaller imaging region by means of the pointing device (see FIG. 1), for example a computer mouse, in that he selects a draw-tool from the palette 14 and "draws" the imaging region within the boundaries of the overview image 13, i.e. the root recording. This technique is basically known from other computer applications and is adopted for the invention to allow a facilitated creation of a child recording.

Figure 5:
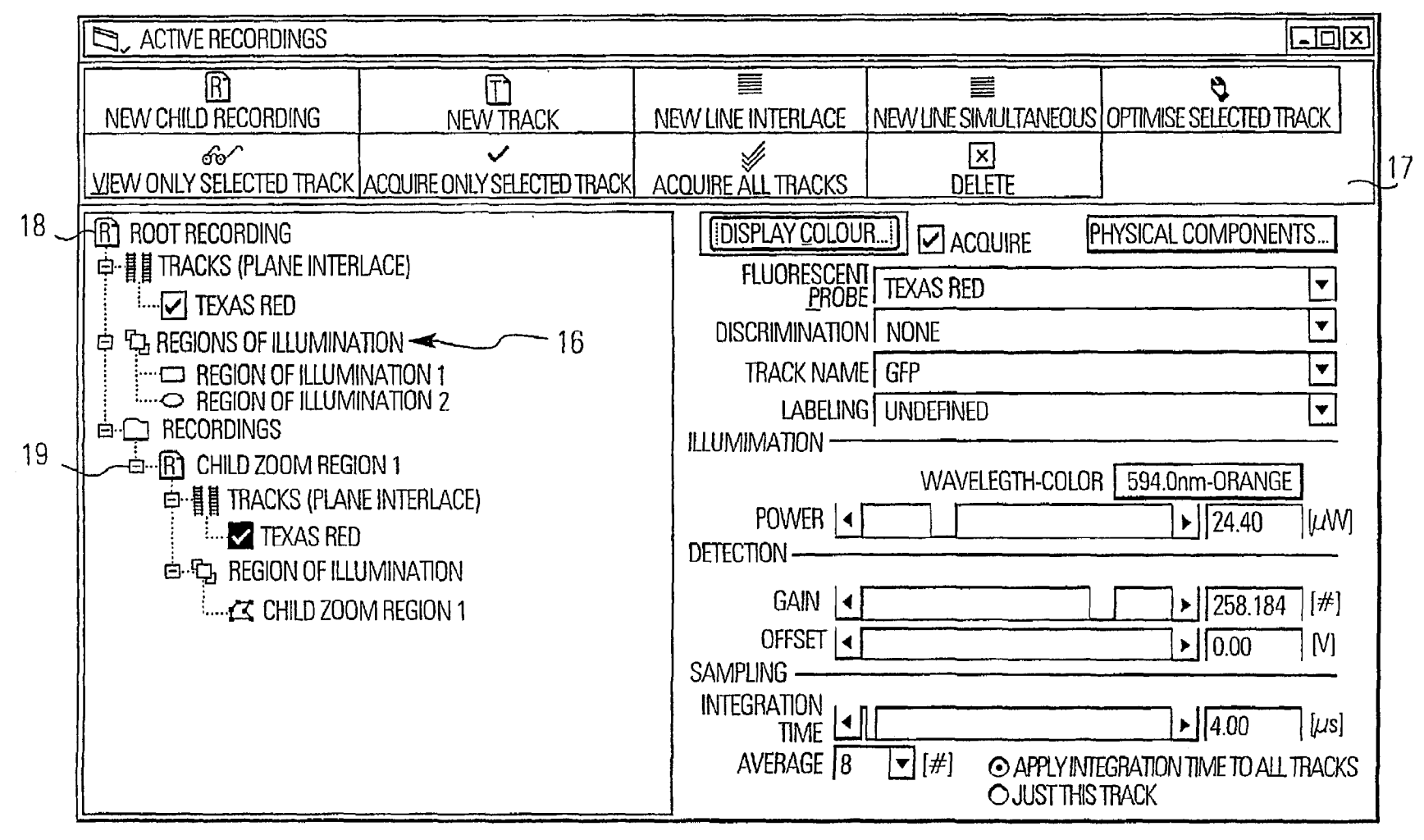

In FIG. 5 another example of a graphical user interface is shown, which is displayed on the display device (see FIG. 1) of the computer controlled microscope, and which shows the recording hierarchy 16 in a user friendly format as well as graphical control elements 17 enabling the user to control the execution of the control program in the computer of the microscope. The diagram 16 represents the recordings hierarchy. A root recording 18 and a single child recording 19 are shown as an example of a recordings hierarchy according to the invention. Basically the structure of the hierarchy shown in FIG. 3 can be easily identified in the diagram of FIG. 5.

In the following some usage examples of the invention will be described to give a better understanding of the scope of the invention and the advantages achieved.

Example 1

Observation of a Field of Cells Spread Over a Wide Area

Whilst continuously scanning the imaging area with the microscope (i.e. continuously executing the "recording execute" function), the user varies the scan stage position and recording parameters until a single cell of interest is found. Once found, other parameters (for example, illumination intensity and detection sensitivity) can be adjusted until an optimal image is obtained. A new imaging window is created, leaving the image of the cell (and associated parameters) on the computer screen in the old window. The user repeats the process of finding cells. When an appropriate number of cells have been found, the user selects each imaging window in turn, and presses a button on the window control bar, which causes the recording contained within the window to be added to the root recording. The root recording thus will contain a number of recordings.

When data acquisition is restarted, each recording in the root recording will be scanned in turn, reusing the scan windows that were used to find the cells.

The recording collection can be scanned at timed intervals, so that many spatially remote cells may be observed time-multiplexed.

Example 2

Observation of a Field of Cells Spread Over a Small Area

A low magnification scan is made, creating an image in which a large number of cells can be identified. Using draw tools selected from a scan window control menu, cells of interest can be drawn on the display, the drawn regions automatically defining child recordings, which are zoomed versions of the main recording, to which they are added. Initiation of image acquisition (recording execution) causes the root (overview) recording, and then all child (cell) recordings to be scanned in sequence.

Acquisition of any one of the recordings can be disabled, for example, such that only the cells are scanned and not the overview recording. The graphical objects defining the cells in the overview window can be manipulated during a scan to adjust the size parameters of the child recordings as they are scanned.

Example 3

Combination of Wide Area and Small Area Observation

A basic recording comprising child recordings can be added to another recording. Thus a recordings hierarchy can be built containing clusters of recordings, within each of which the scan stage doesn't have to be moved (e.g. since this is slow).

Example 4

Optimal Observation of Different Regions within a Single Cell

Cells marked with fluorescent probes may have some structures containing a high density of fluorophore, and other structures with lower densities. An initial, non-optimal scan can be made, upon which the areas to be optimised are drawn, the drawn regions automatically defining child recordings, which are unzoomed versions of the root recording. Each child recording, by default inherits parameters (other than size) from the parent recording. Thereby, the user can optimise illumination intensity and detection sensitivity for each region.

Example 5

Combination of Three-dimensional, Two-dimensional and One-dimensional Data Acquisition A confocal fluorescence microscope is able to measure fluorescence intensity within a three-dimensional volume. A single recording might constitute a single sample or line. A two-dimensional confocal image can represent a slice through a sample. A stack of slices thus constitutes a three-dimensional data representation of the sample. For such a machine, each recording within the recordings hierarchy is defined in three dimensions. A recordings hierarchy may therefore be constructed, which contains recordings of different dimensionality. Examples might include:

An overview two-dimensional slice through a field of cells, containing child recordings, which are three-dimensional stacks.

A recording creating a single, overview two-dimensional image of a single cell (Nomarski contrast), and a child recording, which defines stack of fluorescent images.

A root recording might define a slice in one direction through a sample, e.g. in a plane orthogonal to the optical axis. Drawing a line onto the overview image causes a child recording to be created. The extent of such a child recording can be extended so that it constitutes a plane orthogonal to its parent

Example 6

"Illumination-only" Processes

There are many instances in which only illumination of a sample, and not observation is interesting:

a) Photobleaching

A common technique in cell biology for observing cargo movements with cells is photobleaching. A cell containing proteins of interest marked with fluorescent dyes is prepared. An initial image of the cell is acquired, after which a high power laser scan is used to bleach areas of fluorophore within the cell. The microscope's light detectors may be turned off during the bleach phase, since the image data collection is not required. After the bleach, a timed sequence of images is then taken to observe transport of fluorophore back into the bleached region.

A simple bleaching experiment might include a root recording, which defines a scan over the whole cell, and one or more child recordings, which are the bleach regions. The data created when scanning the bleach regions is a kind of dummy, since the experimenter is often only interested in controlling the amount of energy hitting the sample, and the area over which illumination occurs. The user simply initiates a timed sequence of scans, upon which the root recording is scanned. Whilst the bleach region is being scanned, the user can toggle the "acquire" option on the bleach region, so that this region is only scanned once in the timed sequence.

The bleach region may be defined with exactly the same parameters as all other recordings, so it is guaranteed that the user has precise information about the shape and position of the bleach region, as well as input energy and the precise time at which the bleach occurred.

b) Photoactivation (Uncaging)

This is basically the opposite of photobleaching, whereby light is used to activate a fluorophore. The parameters describing precisely when, where and how the compound was activated are neatly contained within a recording object.

c) Inhibition

This is similar to photobleaching. Compounds can be caged, or their biological function switched off by illumination with a characteristic wavelength.

Example 7

"Observation-only" Processes

In some experiments, samples can show Bioluminescence (Chemiluminescence), i.e. samples emit light without the need for illumination light.

What is claimed is:

1. A method of controlling a microscope with a computer comprising the use of a recordings hierarchy of parent recordings and child recordings, each of which comprises a set of control parameter data, and of which the child recordings are linked to a single parent recording such that a selected group of control parameter data of the parent recording are inheritable by the child recordings, wherein the set of control parameter data comprises a parameter indicating whether a recording is enabled or disabled in the recordings hierarchy.

2. A method of controlling a microscope with a computer comprising the use of a recordings hierarchy of parent recordings and child recordings, each of which comprises a set of control parameter data, and of which the child recordings are linked to a single parent recording such that a selected group of control parameter data of the parent recording are inheritable by the child recordings, wherein the method comprises a step of saving recordings from a computer memory onto a storage device such that whenever the parent recording is saved a selected group of the child recordings are saved as well.

3. A method of controlling a microscope with a computer comprising the use of a recordings hierarchy of parent recordings and child recordings, each of which comprises a set of control parameter data, and of which the child recordings are linked to a single parent recording such that a selected group of control parameter data of the parent recording are inheritable by the child recordings, wherein the method comprises a step of loading recordings from a storage device into a computer memory such that whenever the parent recording is loaded a selected group of the child recordings are loaded as well.

4. A computer controlled microscope comprising a computer for controlling the microscope, wherein the computer is adapted to execute a control program creating in a memory of the computer a recording hierarchy of parent recordings and child recordings, each of which comprise a set of control parameter data, and of which the child recordings are linked to a single parent recording such that selected control parameter data of the parent recording are inheritable by the child recordings, wherein the set of control parameter data comprises a parameter indicating whether a recording is enabled or disabled in the recordings hierarchy.

5. A computer controlled microscope comprising a computer for controlling the microscope, wherein the computer is adapted to execute a control program creating in a memory of the computer a recording hierarchy of parent recordings and child recordings, each of which comprise a set of control parameter data, and of which the child recordings are linked to a single parent recording such that selected control parameter data of the parent recording are inheritable by the child recordings, wherein the computer is adapted to execute a control program for saving recordings from a computer memory onto a storage device such that whenever the parent recording is saved a selected group of the child recordings are saved as well.

6. A computer controlled microscope comprising a computer for controlling the microscope, wherein the computer is adapted to execute a control program creating in a memory of the computer a recording hierarchy of parent recordings and child recordings, each of which comprise a set of control parameter data, and of which the child recordings are linked to a single parent recording such that selected control parameter data of the parent recording are inheritable by the child recordings, wherein the computer is adapted to execute a control program for loading recordings from a storage device into a computer memory such that whenever the parent recording is loaded a selected group of the child recordings are loaded as well.

7. A data carrier carrying a computer software product to be loaded into a memory of a computer of or a computer linked to a microscope for controlling at least one of the sequence of operations and a status of said microscope, the computer software product having computer readable code embodied therein which comprises means adapted to create in the memory of the computer a recordings hierarchy of parent recordings and child recordings such that each recording comprises a set of control parameter data and such that each child recording is linked to a single parent recording in such a way that control parameter data of the parent recording are inheritable by the child recordings, wherein the set of control parameter data comprises a parameter indicating whether a recording is enabled or disabled in said recordings hierarchy.

8. A data carrier carrying a computer software product to be loaded into a memory of a computer of or a computer linked to a microscope for controlling at least one of the sequence of operations and a status of said microscope, the computer software product having computer readable code embodied therein which comprises means adapted to create in the memory of the computer a recordings hierarchy of parent recordings and child recordings such that each recording comprises a set of control parameter data and such that each child recording is linked to a single parent recording in such a way that control parameter data of the parent recording are inheritable by the child recordings, wherein the computer readable code comprises means adapted to save recordings from a computer memory onto a storage device such that whenever the parent recording is saved a selected group of the child recordings are saved as well.

9. A data carrier carrying a computer software product to be loaded into a memory of a computer of or a computer linked to a microscope for controlling at least one of the sequence of operations and a status of said microscope, the computer software product having computer readable code embodied therein which comprises means adapted to create in the memory of the computer a recordings hierarchy of parent recordings and child recordings such that each recording comprises a set of control parameter data and such that each child recording is linked to a single parent recording in such a way that control parameter data of the parent recording are inheritable by the child recordings, wherein the computer readable code comprises means adapted to load recordings from a storage device into a computer memory such that whenever the parent recording is loaded a selected group of the child recordings are loaded as well.

* * * * *